United States Patent [19]

Woods

[11] Patent Number: 4,646,083
[45] Date of Patent: Feb. 24, 1987

[54] BOREHOLE MEASUREMENT AND TELEMETRY SYSTEM

[75] Inventor: Allan O. Woods, Houston, Tex.

[73] Assignee: Hydril Company, Los Angeles, Calif.

[21] Appl. No.: 604,284

[22] Filed: Apr. 26, 1984

[51] Int. Cl.$^4$ .............................................. G01V 1/40
[52] U.S. Cl. .................................... 340/856; 340/857; 340/859
[58] Field of Search ............... 340/856, 857, 858, 859, 340/855; 328/22, 35, 36; 307/297, 491, 314

[56] References Cited

U.S. PATENT DOCUMENTS

| | | | |
|---|---|---|---|
| 2,573,137 | 10/1951 | Greer | 340/859 X |
| 2,968,738 | 1/1961 | Pintell | 307/297 |
| 3,182,286 | 5/1965 | Zimmerman et al. | 340/856 |
| 3,732,728 | 5/1973 | Fitzpatrick | 340/854 X |
| 3,982,189 | 9/1976 | Brooks et al. | 328/22 X |
| 4,093,936 | 6/1978 | Eberline et al. | 340/857 |

Primary Examiner—Charles T. Jordan
Assistant Examiner—John W. Eldred
Attorney, Agent, or Firm—Dodge, Bush, & Moseley

[57] ABSTRACT

A measuring and telemetry system is disclosed adapted to measure the ambient pressure and temperature in a downhole environment, and to telemeter signals representative of such measurements to the wellhead for demodulation and display. Only two wires are used in the system between the wellhead and the measuring location downhole. The two wires are used for both the power applied downhole and measurement signals transmitted uphole. A current balance circuit is provided for a downhole iron core transformer through which the DC power is provided through one winding. The current balance circuit senses a signal representative of the DC current flowing through the one winding and applies an equal in magnitude but opposite in direction current through the other winding of the transformer to prevent magnetic saturation of the transformer.

Multiplexing circuits are provided downhole for generating a multiplexed signal of two sine waves the frequency of each being representative of the pressure signal or the temperature signal. Such multiplexed signal is applied to the first winding of the downhole transformer for inductive coupling to the second winding and to the electrical leads for transmission uphole. Uphole circuits are provided for demultiplexing and displaying signals representative of the downhole pressure and temperature.

This abstract of the disclosure is neither intended to define the scope of the inventions, which is measured by the claims, nor is it intended to limit the invention in any way.

11 Claims, 12 Drawing Figures

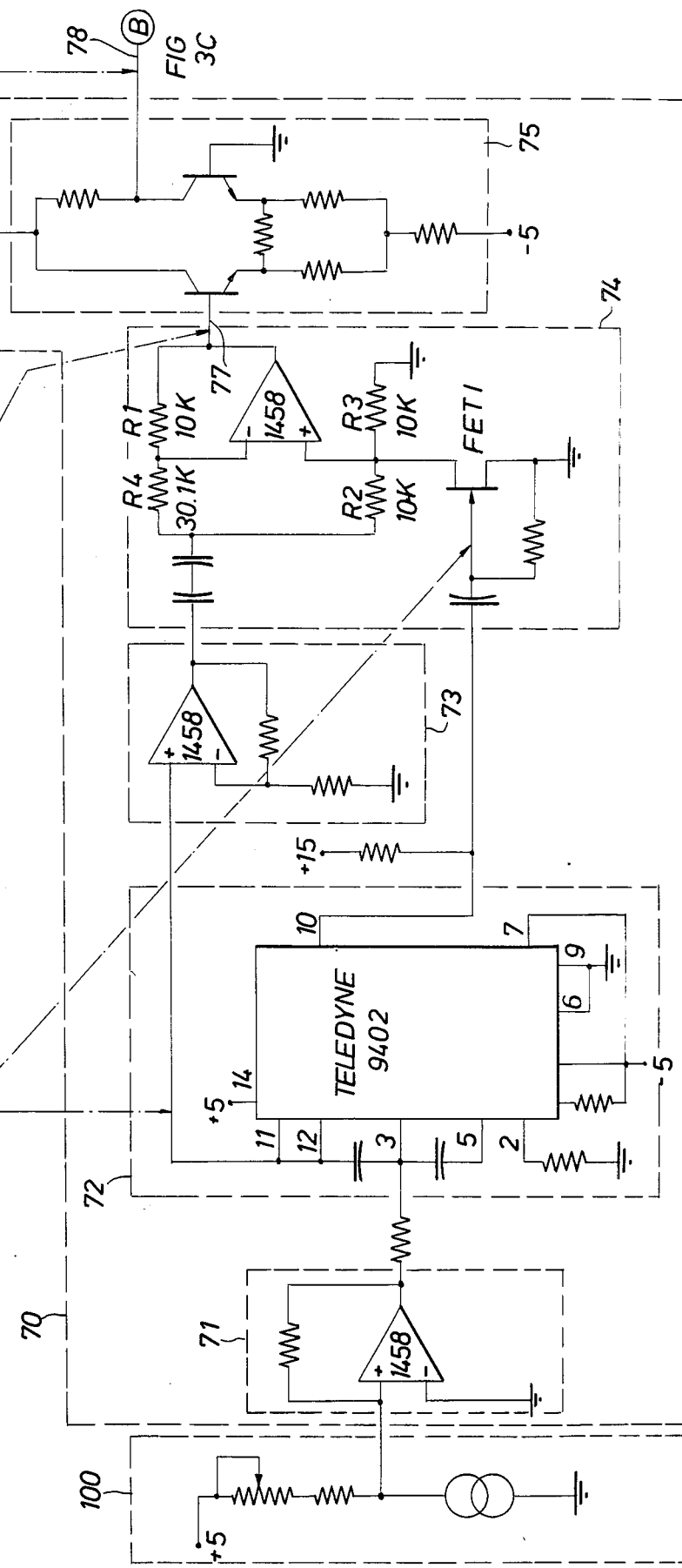
FIG. 3A (AREA 1) (TEMPERATURE CHANNEL)
FIG.3A' SAW TOOTH WAVE
FIG.3A" SQUARE WAVE f/2
FIG.3A'" TRIANGULAR WAVE f/2

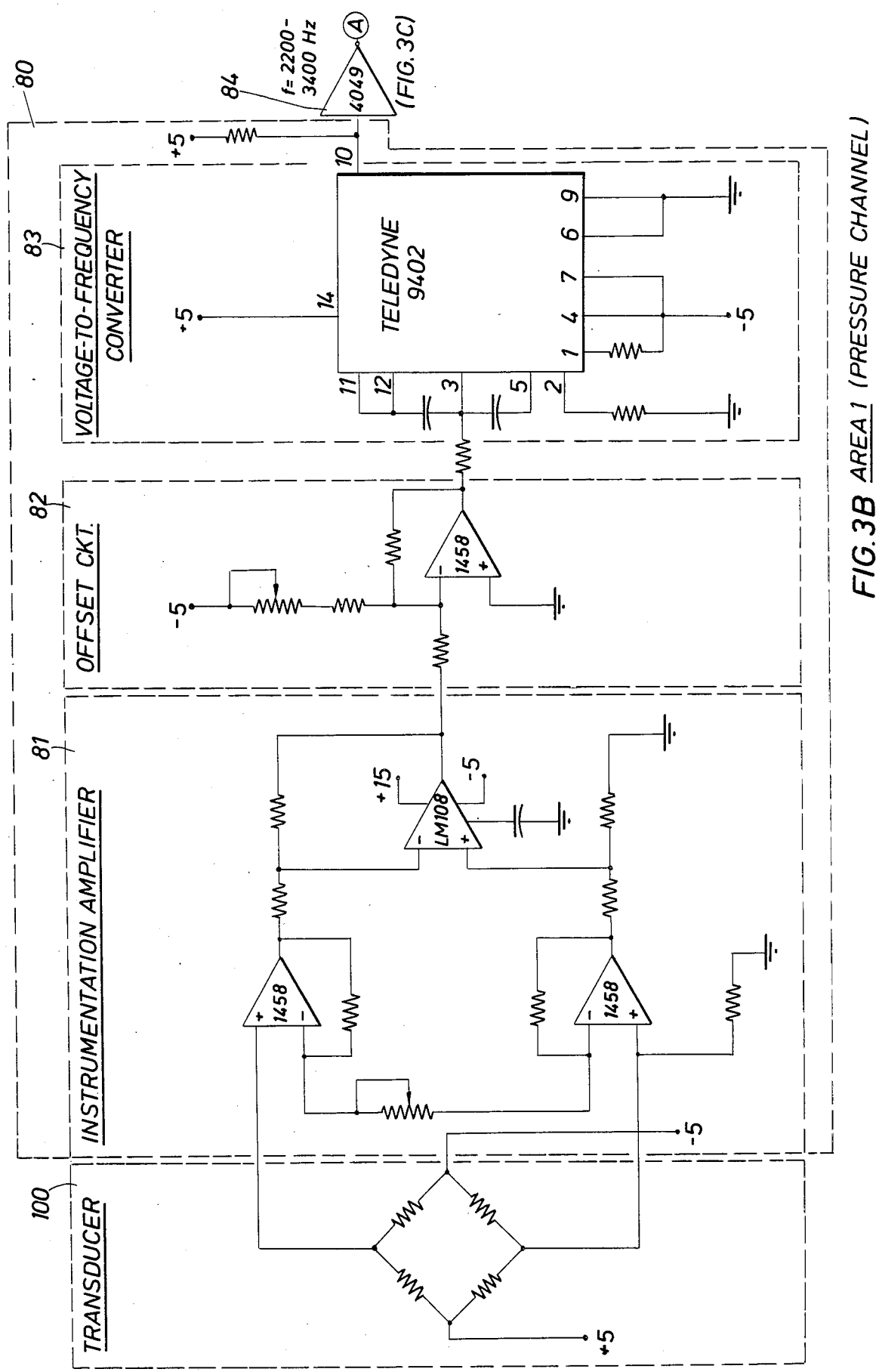
FIG.3B AREA 1 (PRESSURE CHANNEL)

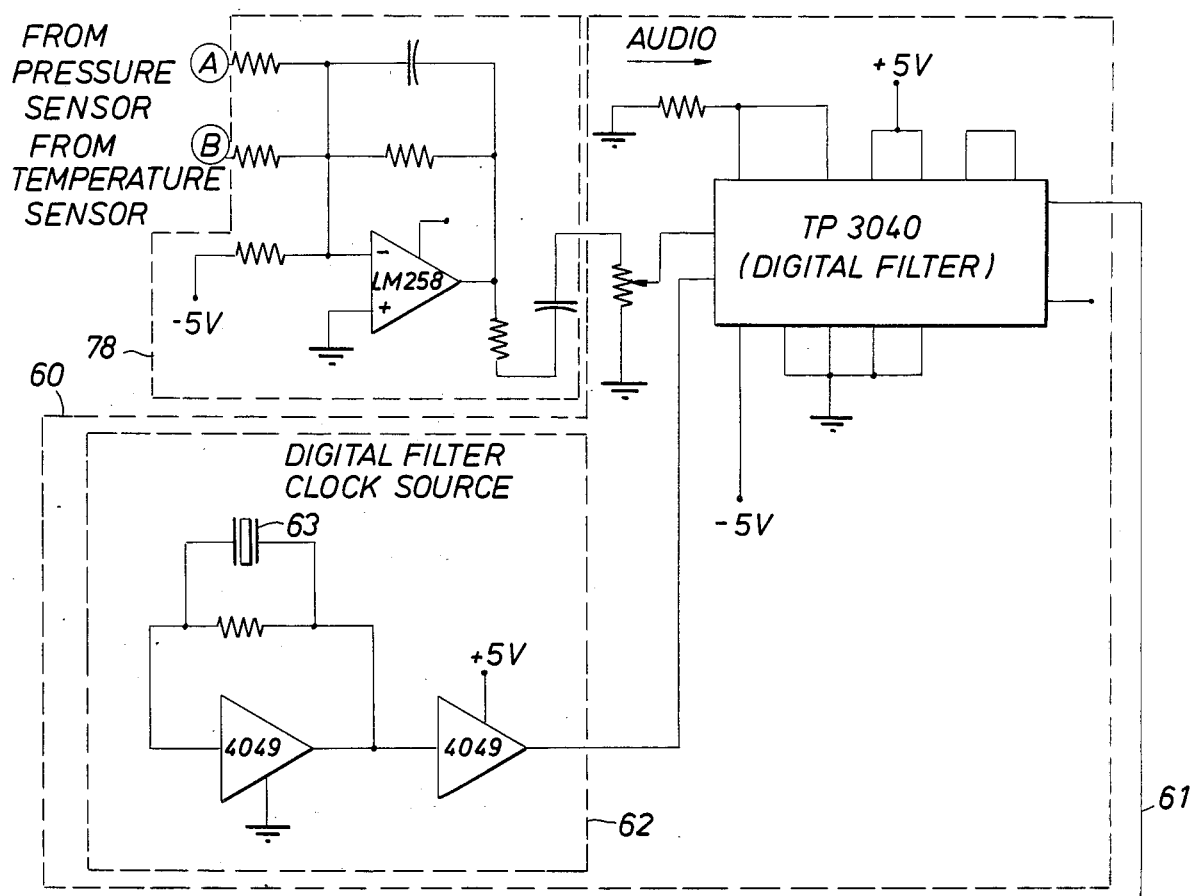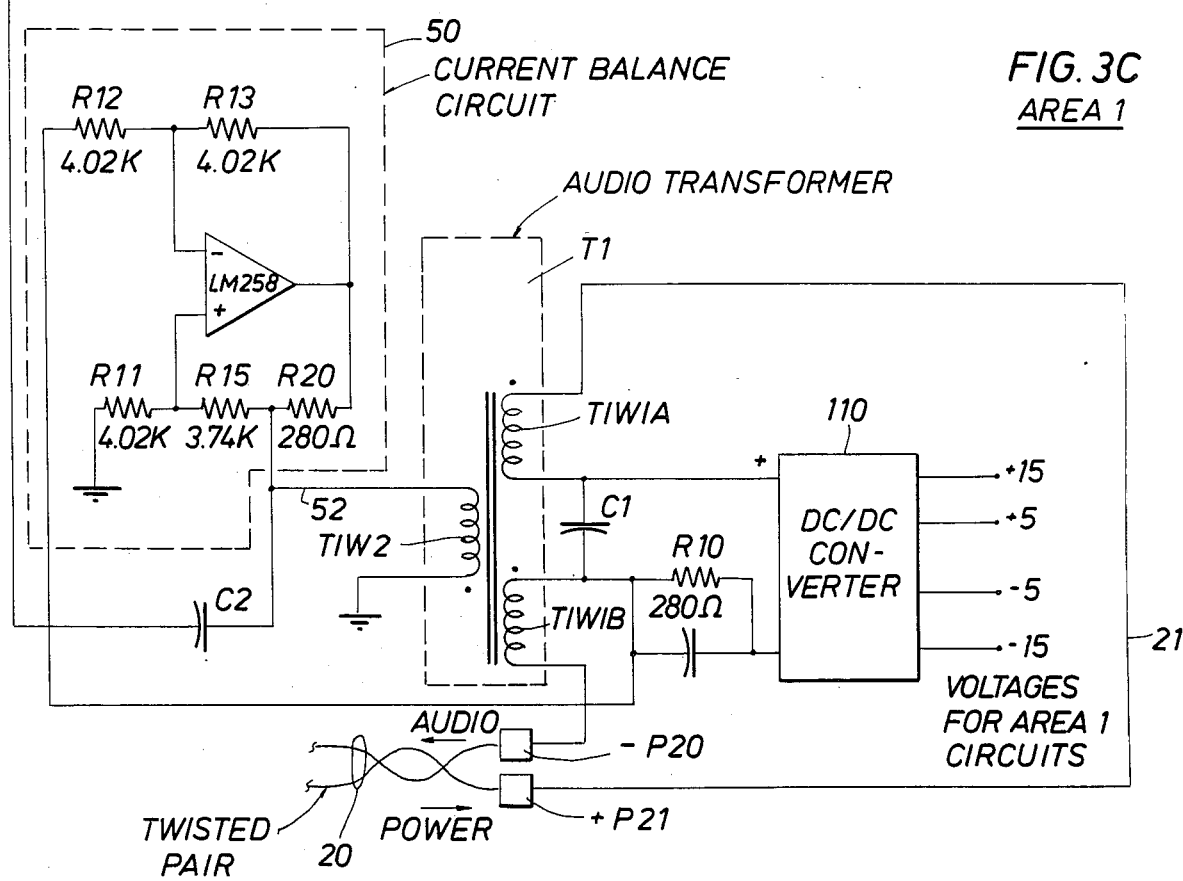
FIG. 3C
AREA 1

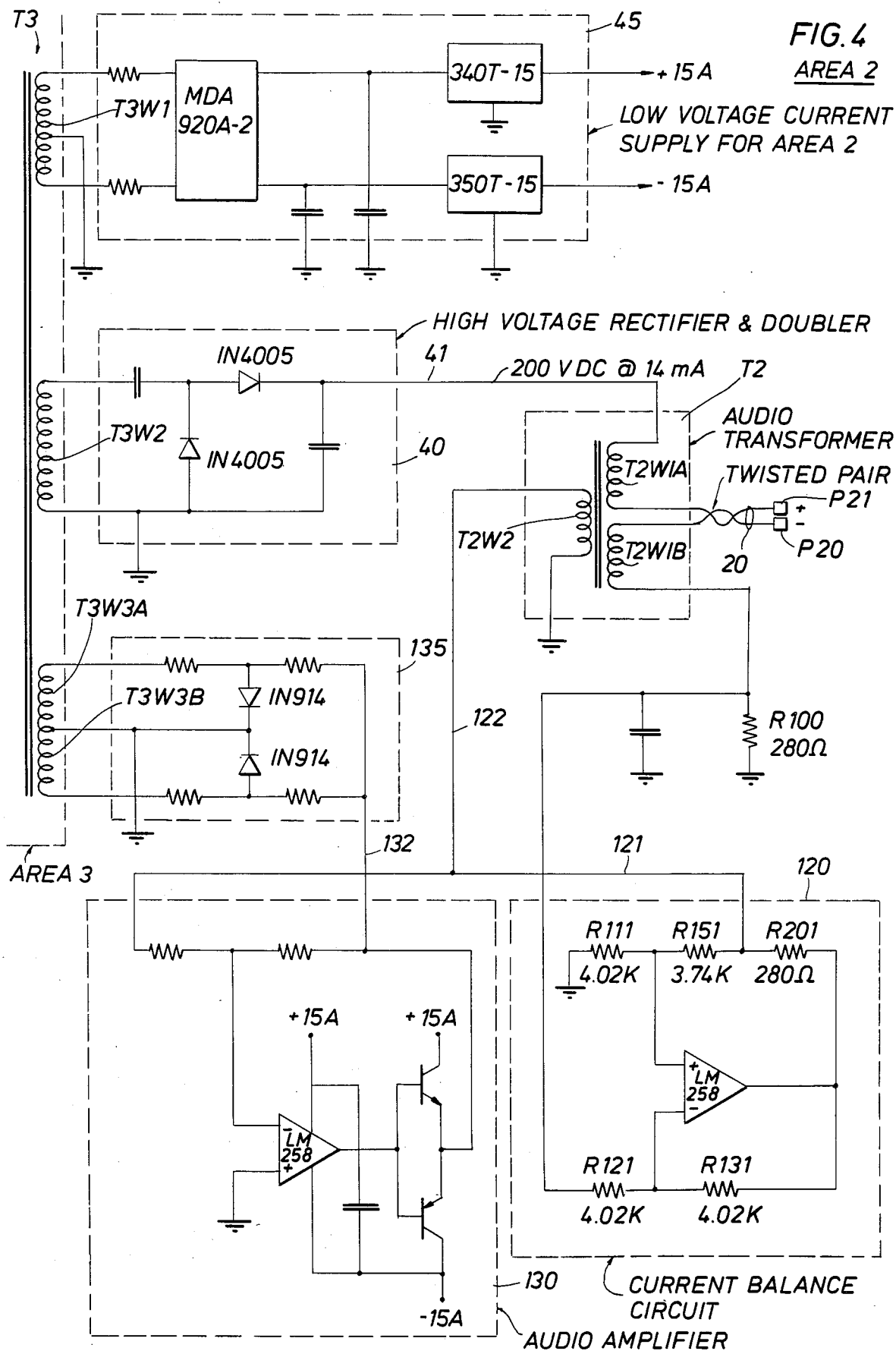

AREA 4

AREA 4

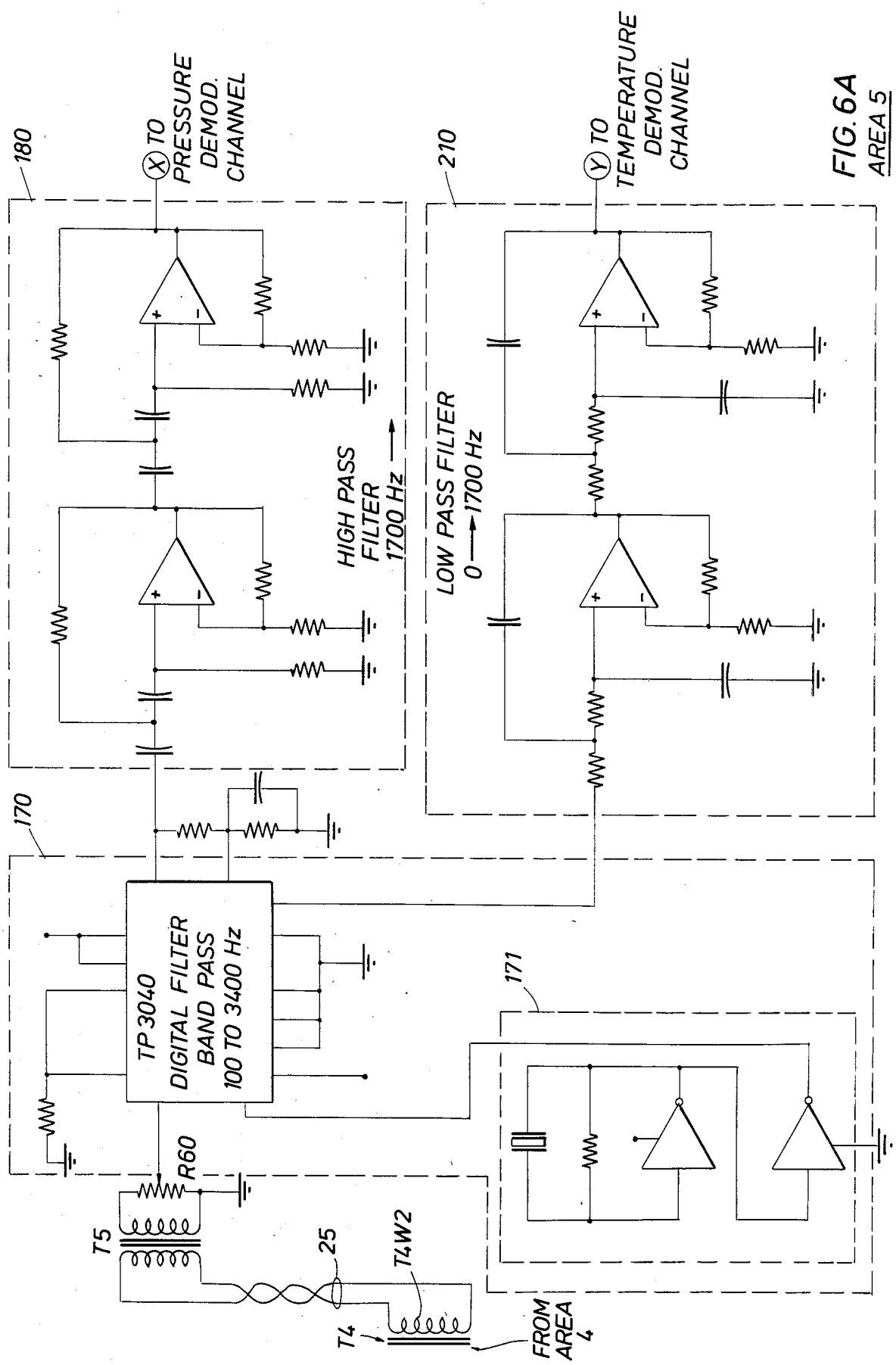
FIG. 6A AREA 5

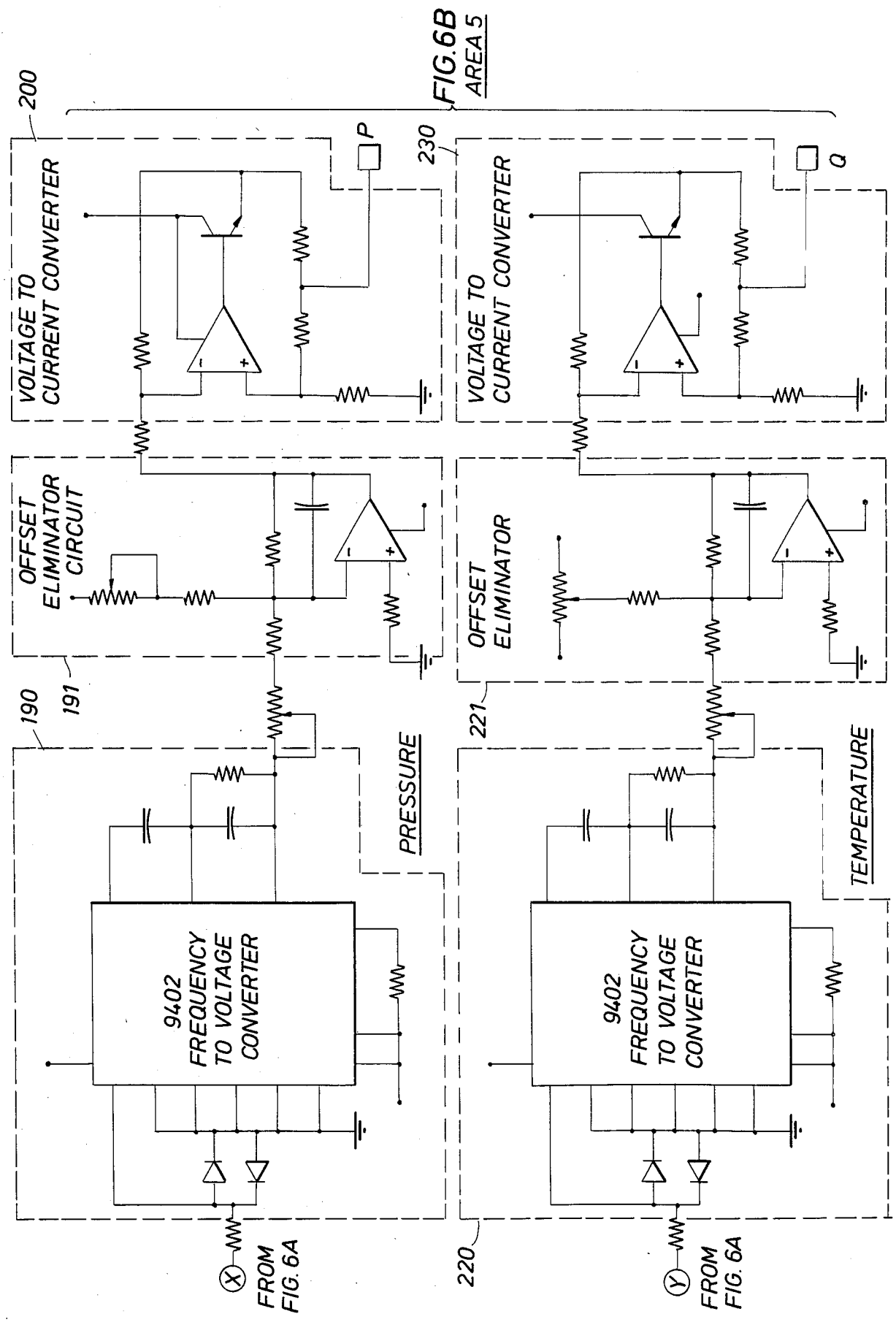

BOREHOLE MEASUREMENT AND TELEMETRY SYSTEM

BACKGROUND OF THE INVENTION

1. Field of the Invention

This invention relates in general to borehole measurement and telemetry systems whereby ambient parameters of a well bore are measured downhole and telemetered uphole. In particular, the invention relates to a system in which but two wires are used to power and communicate with the downhole instrumentation and telemetry circuitry.

2. Description of the Prior Art

Downhole measurement and instrumentation systems are known especially in the field of well logging. However, the invention described herein relates to providing a downhole measurement system which may be placed in a producing well to provide a continuous recording of a downhole parameter for the life of the producing well.

Providing electrical leads to a downhole instrumentation system in a producing well can be a source of difficulty for oil well owners. It is possible to run hydraulic fluids and electrical conductors by means of elastomeric encapsulated conduits running between the wellhead and the downhole instrument package but the more conductors that are provided, the more expensive is such a conduit package. Therefore, it has been desirable in the art to provide an instrumentation and telemetry system having but two conductors reaching between wellhead electronics and a downhole instrumentation package. One of the problems that has faced inventors in this field has been providing downhole DC power over such a long distance as may be required to reach from the wellhead to the instrumentation package. For example, many wells reach from 5,000, 10,000, 15,000 and more feet. Therefore, any electrical leads that reach to such depths inherently have high ohmic losses due to their length. In order to avoid high IR losses due to high current type supply systems, it has been known in the prior art to provide high voltage via a pair of leads for supplying power in one direction and multiplexing signals back in the other.

However, such a system inherently requires the use of transformers and due to the limited space of such a downhole probe or instrumentation package, very small transformers have had to be provided. In order to provide sufficient inductive coupling through such transformers, they have required the use of an iron core. Small iron core transformers can tolerate only a very small imbalance in DC currents flowing in the primary and secondary windings due to magnetic saturation of the small iron core if imbalance occurs. Such saturation inherently disrupts the linear coupling of any AC signal that is required to be telemetered through such a transformer back up the electrical leads to wellhead instrumentation.

Another problem faced by the prior art has been the generation of pure sine waves downhole for the representation of at least two downhole parameters such as pressure and temperature. Pure sine waves representing both parameters are desired to be multiplexed together and then applied through the downhole transformer and up the pair of electrical conductors back to the surface.

3. Identification of the Objects of the Invention

It is therefore a primary object of the invention to provide a two wire instrumentation and telemetry system for measuring at least two parameters downhole and sending a multiplexed signal representative of those two parameters via said two wires back to the surface while overcoming the problems faced by prior art designers.

Another object of the invention is to provide a current balancing circuit for a downhole instrumentation system in which the current flowing through one side of a small iron core transformer is sensed and a substantially equal and opposite current is generated in response thereto for applying to the other winding of the transformer in order to avoid magnetic saturation of the core of the transformer.

Still another object of the invention is to provide a novel circuit to generate a sine wave having its fundamental frequency identical to a square wave the frequency of which represents a parameter to be measured.

Still another object of the invention is to provide a system for measuring the temperature and pressure ambient at the bottom of the well and telemetering a signal representative of temperature and pressure to the top of the well.

It is another object of the invention to provide electronic circuits responsive to the signals transmitted to the top of the well and generating standard four to twenty milliampere signals representing the two measured quantities at the bottom of the well.

SUMMARY OF THE INVENTION

According to the invention, a measuring and telemetry system is provided to sense the ambient pressure and temperature in a downhole environment and telemeter a signal representing those two parameters from the hole through the wellhead to a receiving unit for display. A source of power is provided to wellhead circuitry. Wellhead electronic circuitry generates a relatively high DC voltage to power the downhole package via two electrical leads and to receive and separate the audio signals from the high voltage present on the single pair of wires.

A purpose of powering the downhole package with high voltage, for example 200 volts DC, is to reduce the IR losses in the pair of leads extending downhole and to provide relatively good voltage regulation at various well depths of the downhole instrumentation.

At the bottom of the hole, 200 volts DC (minus any line loss) is converted by a DC/DC converter to the low voltages required by downhole electronic components, for example, plus and minus 5 volts DC and plus and minus 15 volts DC.

The downhole instrumentation system includes a strain gauge pressure transducer and a solid state temperature transducer. The current output of the temperature transducer is converted to an equivalent voltage before conversion to an audio AC signal or "tone" for transmitting uphole.

In order to enable a single pair of wires to transmit two signals plus power between uphole and downhole, a frequency division multiplexing system is disposed downhole. DC power is transmitted from uphole to the downhole electronics and of course is of essentially a zero frequency. The two measured quantities of pressure and temperature are converted to audio tones. For example, the temperature is represented by an audio tone in the frequency range of 300–1500 HZ and the pressure is represented by a tone in the range of 2200-3400 HZ. A guard band is provided from 1500-2200 HZ to allow separation of the two information channels and to assure that there is no interference between either channel.

The two amplified pressure and temperature slowly varying signals are applied to separate voltage to frequency converters to produce the tones mentioned above. After signal manipulation to improve spectra purity, the two signals are combined and filtered to attenuate signal energy outside the 100 HZ to 3400 HZ band. The output of the filter is then applied to the downhole line transformer and transmitted to the wellhead.

The wellhead electronics receive the audio tones from downhole and separate them from the 200 volts DC applied at the wellhead to the electrical leads for transmission downhole. The relatively low level signals are amplified and applied to a diode modulator connected to a magnetic coupler for a subsea wellhead application of the invention. The lower half of the coupler is used both as a transformer primary and as a secondary for power purposes. Two other windings of the wellhead magnetic coupler are provided to couple with rectifiers to produce low voltages required by wellhead amplifiers and the high voltage used to power the downhole instrumentation package. For a land well, the coupling from the surface instrumentation to the electrical leads extending into the well may be a direct electrical connection or like for the subsea embodiment, may be an inductive coupling.

The recovered signal at the wellhead is then passed through a low pass active filter where any components of the 15 kilohertz oscillator used to drive the magnetic coupler are removed. The multiplexed signal is then passed through a band pass filter and then separated into a pressure signal and a temperature signal for driving recorders, meters or the like.

More particularly according to the invention, a measuring and telemetry system is provided for measuring at least two parameters in a borehole and telemetering at least two signals indicative of those parameters to a wellhead location of the borehole. The system includes a pair of electrical leads extending from the borehole wellhead to a measuring location below in the borehole. Means are disposed at the wellhead for generating and applying a relatively high DC voltage to said electrical leads for transmission of DC current to the measuring location.

A DC/DC converter is provided at the measuring location in the borehole and is connected in series with a first winding of a measuring location iron core transformer. The series combination of the first winding of the iron core transformer and the DC/DC converter is connected in series with the two electrical leads at the measuring location in the borehole. The DC/DC converter circuit is provided for converting the relatively high DC voltage on the electrical leads to the relatively low voltages necessary to power measuring location electrical circuits.

A means is provided for generating a current indicator signal indicative of the DC current flowing in the first winding of the measuring location transformer. A current balance circuit responsive to the current indicator signal applies through a second winding of the measuring location transformer a DC current which is substantially the same in magnitude but of opposite direction as a DC current flowing in the first winding of the transformer.

First and second measuring location transducers are provided for generating first and second downhole measurement signals indicative of those two parameters in the borehole. Measuring location multiplexing means responsive to the first and second downhole measuring signals generate a combined AC signal comprised of two downhole audio AC signals. The frequency of the two audio AC signals are indicative respectively of the first and second downhole measurement signals. The combined AC signal is applied to the second winding of the measuring location iron core transformer to provide inductive coupling of the combined AC signal to the first winding of the transformer for transmission of the combined AC signal to the borehole wellhead via the two electrical leads.

The sytem described above further comprises means for receiving the combined AC signal at the wellhead, means for demodulating the combined AC signal into two uphole audio signals the frequencies of which correspond respectively to the frequency of the two downhole audio AC signals, and a means responsive to the two uphole audio signals for generating first and second DC signals corresponding to the first and second downhole measurement signals.

According to the invention, a downhole circuit arrangement includes a first transducer means for generating a first signal indicative of a first parameter, for example, temperature. A first voltage to frequency circuit means responsive to the first signal is provided for generating a first square wave signal having a frequency proportional to the first signal. The frequency range of the square wave signal is from a first frequency $f_1$ to a second frequency $f_2$ corresponding the dynamic range of the first signal. Circuit means responsive to the first square wave signal is provided for generating an essentially pure first sine wave signal having the same fundamental frequency as the first square wave signal.

A second transducer means is provided for generating a second signal indicative of a second parameter, for example pressure. A second voltage to frequency circuit means is provided for generating a second square wave signal having a frequency proportional to the second signal. The frequency range of the square wave signal is from a third frequency $f_3$ to a fourth frequency $f_4$ corresponding to the dynamic range of the second signal. The frequency $f_3$ is larger than the frequency $f_2$, the difference in frequencies between $f_3$ and $f_2$ defining a guard frequency range. Means are provided for adding the first sine wave signal to the second square wave signal to generate a first combined signal. A low pass filter circuit having a frequency cutoff at approximately the frequency $f_4$ is provided for converting the second square wave signal to a second essentially pure sine wave signal having the same fundamental frequency as the second square wave signal and for generating a second combined signal comprising the first sine wave signal and the second sine wave signal. Means are also provided for applying the second combined signal to the two electrical leads for transmitting said signal uphole.

According to the invention, the circuit means responsive to the first square wave signal for generating an essentially pure first sine wave signal having the same fundamental frequency as the first square wave signal includes means for generating a sawtooth wave signal in synchronism with the first square wave signal and having a frequency twice that of the first square wave signal. Circuit means are provided responsive to the sawtooth wave signal and to the square wave signal for generating a triangular wave signal in synchronism with the first square signal. A differential amplifier circuit is provided responsive to the triangular wave signal for generating the first sine wave signal.

According to the invention, the circuit means for generating a triangular wave signal comprises an operational amplifier having a negative input terminal, a positive input terminal and an output terminal. A first resistor of R ohms is provided between the output terminal and the negative input terminal of the operational amplifier. A second resistor of R ohms is connected between the positive input terminal and a common point. The third resistor of R ohms is connected between the positive input terminal and ground. A fourth resistor of approximately three R ohms is connected between the negative input terminal and the common point. Switch means are provided between the positive input terminal and ground. Means are provided for applying the sawtooth wave signal to the common point to which the second and fourth resistors are connected. Means are provided for applying the square wave signal to the switch means operably alternatingly connecting the positive input terminal to ground or to the connection between the second and third resistors on alternating half cycles of the square wave. During first half cycles of the square wave, the sawtooth wave signal is amplified by $+\frac{1}{3}$ and during second half cycles of the square wave, the sawtooth wave signal is amplified by $-\frac{1}{3}$ operably producing a triangularly shaped wave signal at the output of the operational amplifier.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIGS. 3A, 3B and 3C illustrate the detailed circuitry for the functional components of the system located in area 1, FIG. 3A illustrating the instrumentation for measuring downhole temperature and generating a sine wave the frequency of which is proportional to the measured temperature, FIG. 3B illustrating the measurement of a signal proportional to downhole pressure and circuitry provided for generating a square wave the frequency of which is proportional to the measured pressure, and FIG. 3C illustrating first a means by which the square wave pressure signal and the sine wave temperature signal is added and filtered to generate a frequency multiplexed signal of two sine waves each having its own frequency proportional to pressure and temperature and means for applying such multiplexed signal onto a winding of an audio transformer for inductively coupling the signal to a pair of electrical leads extending from the wellhead to the downhole location and also illustrating a means by which DC power applied uphole to the downhole location via the two electrical leads is applied to a DC/DC converter via the other winding of the audio transformer with means for assuring that the currents flowing in both windings are balanced so as to prevent magnetic saturation of the iron core of the audio transformer;

FIG. 4 illustrates circuitry disposed physically at area 2 and having electronics for applying the high voltage to the electrical leads extending downhole and receiving the frequency multiplexed signal generated downhole for further processing and eventual de-multiplexing of the received signal and further illustrating a coupling means designated partially by area 3 by which AC and DC signals are coupled from one part of the electronic system to another;

FIGS. 5A and 5B illustrate specific electronic components disposed in area 4 of FIG. 2 and illustrate in FIG. 5A, a 15 kilohertz square wave oscillator for powering the system by generating a high frequency alternating current to a transformer winding in area 3, while FIG. 5B illustrates the means by which the frequency multiplexed signal coupled to the transformer in area 3 is first filtered, then amplified and then passed to demodulation instrumentation circuitry in area 5; and FIGS. 6A and 6B illustrate area 5 circuitry provided to separate the two signals of the multiplexed signal generated downhole and to demodulate each of them and generate current signals indicative of the measure downhole signals for driving meters, chart recorders of the like.

DESCRIPTION OF THE INVENTION

Figure 1:
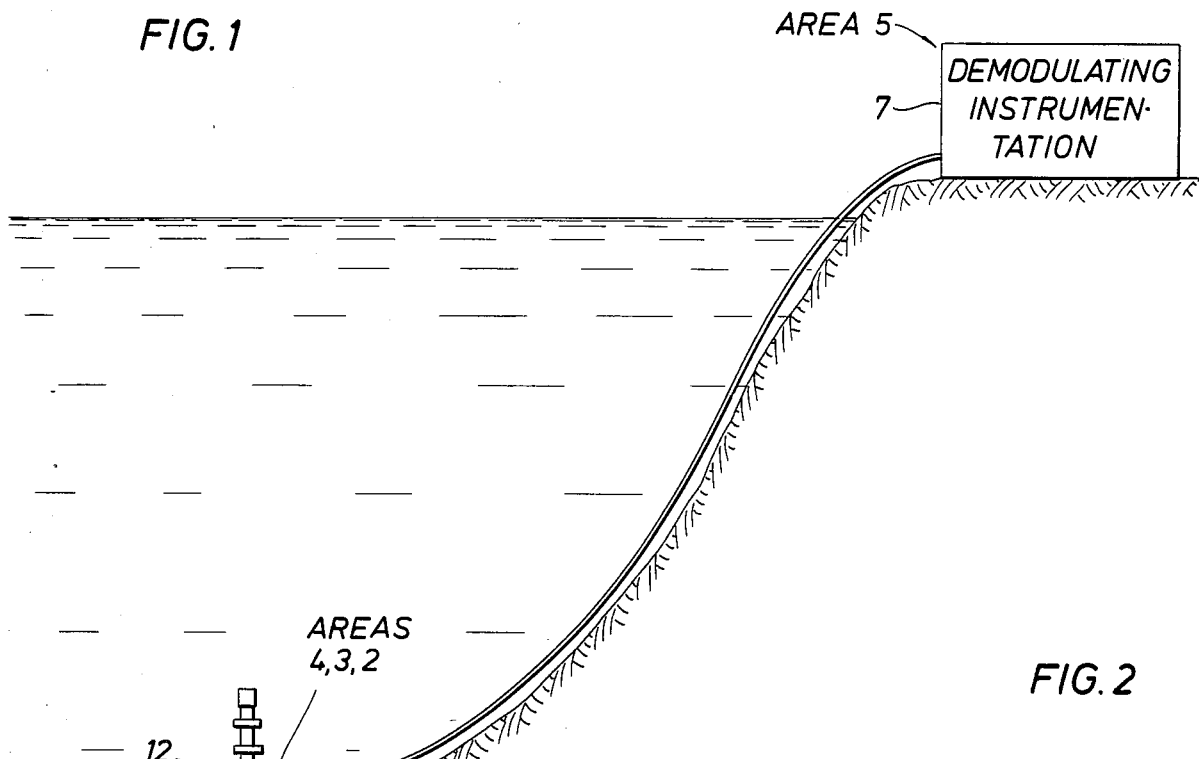
FIG. 1 illustrates schematically an illustrative embodiment of the invention having a downhole instrumentation package and telemetry system for powering the instrumentation system while telemetering data to the wellhead for recording or display.

FIG. 1 illustrates the invention in a preferred embodiment where a subsea well extends through a borehole 13 and includes a subsea wellhead 12 with tubing 9 extending into the well to a downhole electronics package 8 disposed for example in a completion zone of the well. Although the illustration of FIG. 1 shows the subsea well completion with demodulating instrumentation 7 disposed at a surface location, other configurations are of course contemplated by the invention. For example, the well may be a land well where the wellhead is on the surface of the land and the demodulating instrumentation 7 is associated with the wellhead. The invention may be applicable to an offshore well where the wellhead is disposed on a platform. In that case, the demodulating instrumentation 7 may be disposed somewhere convenient on the platform where the wellhead 12 is located.

A conduit 14 is preferably strapped to the tubing 5 and extends from the wellhead 12 to the transducers and downhole electronics 8 disposed typically at the bottom of the well. The downhole package 8 of transducers and downhole electronics may be physically located anywhere in the well, not necessarily in the producing zone but most likely it is located near a producing zone where parameters such as pressure and temperature may be of interest to the well owner for recording over a long period of time as an indication of the condition of the well.

Figure 2:
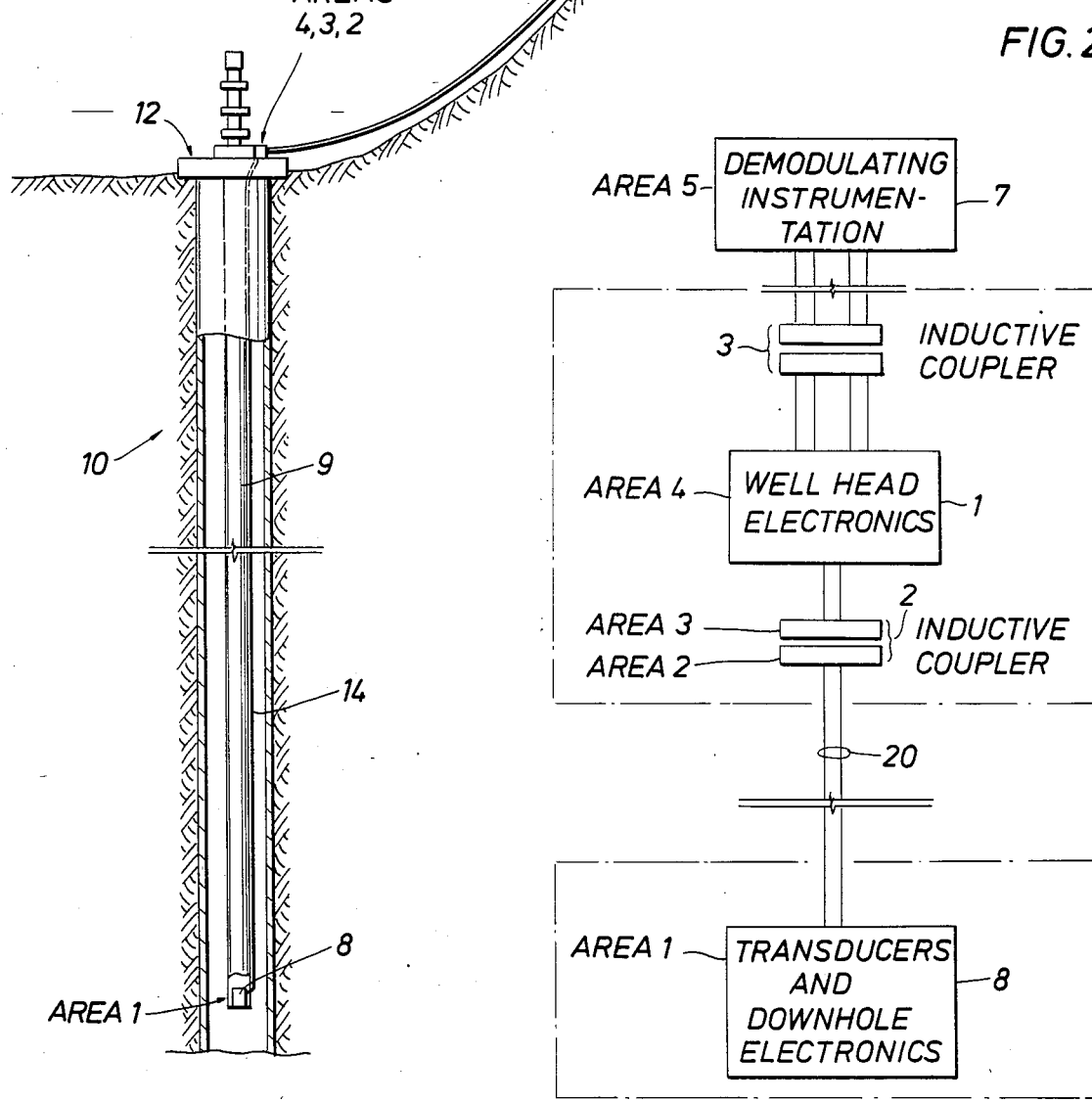
FIG. 2 illustrates the functional components of the instrumentation and telemetry system showing an illustration of the physical location of the components for a subsea wellhead.

Turning now to FIG. 2, a broad functional diagram of the various elements of the instrumentation and telemetry system are indicated showing physically where they may be located. For example, the transducers and downhole electronics 8 are of course located in the well and are connected to the wellhead by means of a single pair of electrical leads 20. Such leads may be disposed in the conduit 14 which may contain hydraulic control lines as well as a pair of electrical leads. Such electrical leads may be typical telephone leads and may extend for a considerable distance into the well, say 10,000 to 15,000 feet. According to the preferred embodiment of the invention, an inductive coupler 2 is provided for coupling wellhead electronics 1 to the leads 20. The wellhead electronics 1 may be connected to the demodulation instrumentation circuits by means of another inductive coupler 3. Although the preferred embodiment of the invention calls for the use of inductive couplers connecting the wellhead electronics with the electrical leads 20 and the transducers and downhole electronics 8 and connecting the demodulating instrumentation 7 with the wellhead electronics 1, other couplers, indeed noninductive couplers, may also be used in other well environments. For example for a land well, dry coupling devices could be used advantageously as opposed to the inductive couplers 3 and 2 illustrated in the preferred embodiment of the invention in a subsea environment.

Figure 2A:
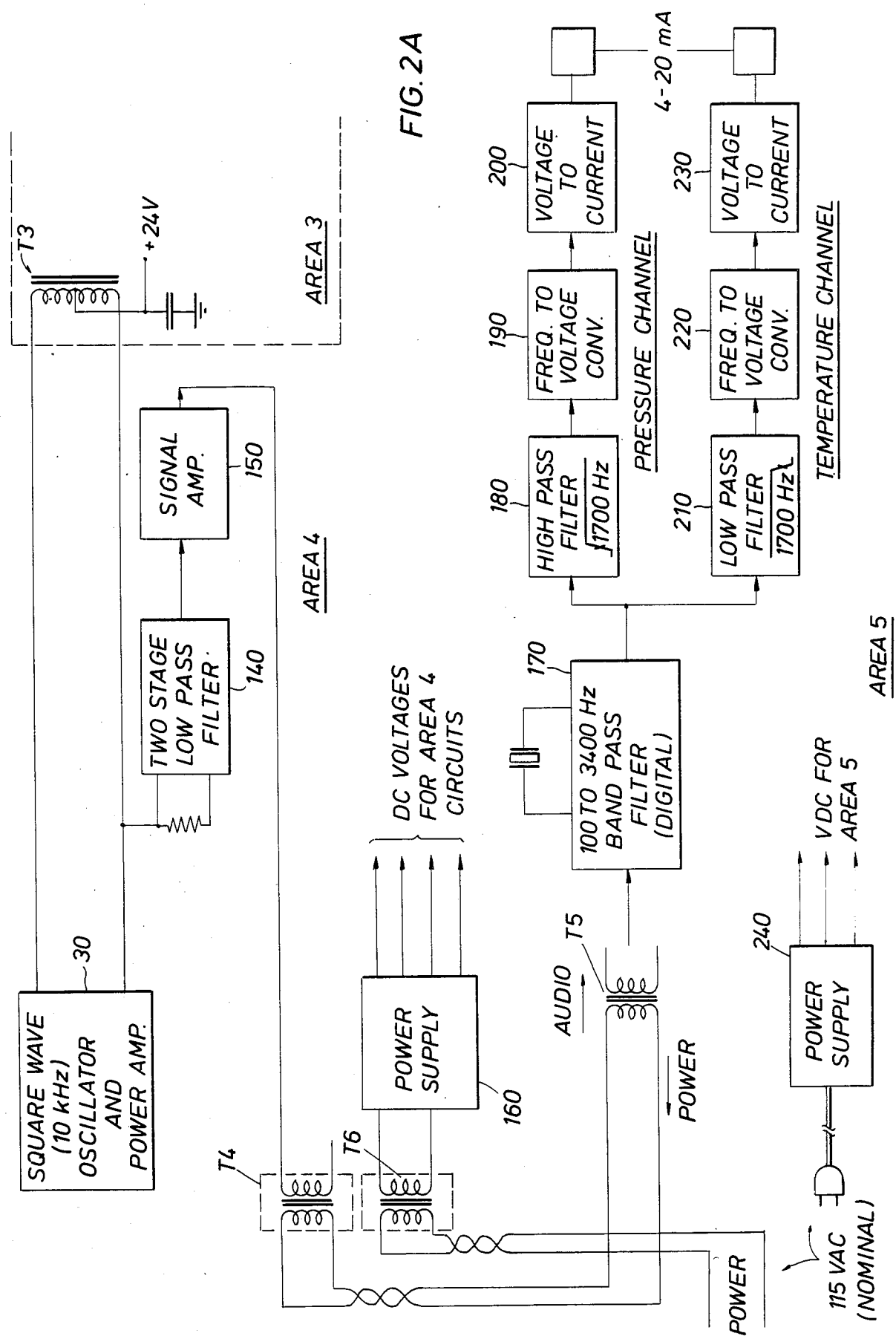
FIGS. 2A and 2B illustrate in more detail the functional components of the system while indicating their areas of location in a preferred embodiment of the system.
Figure 2B:
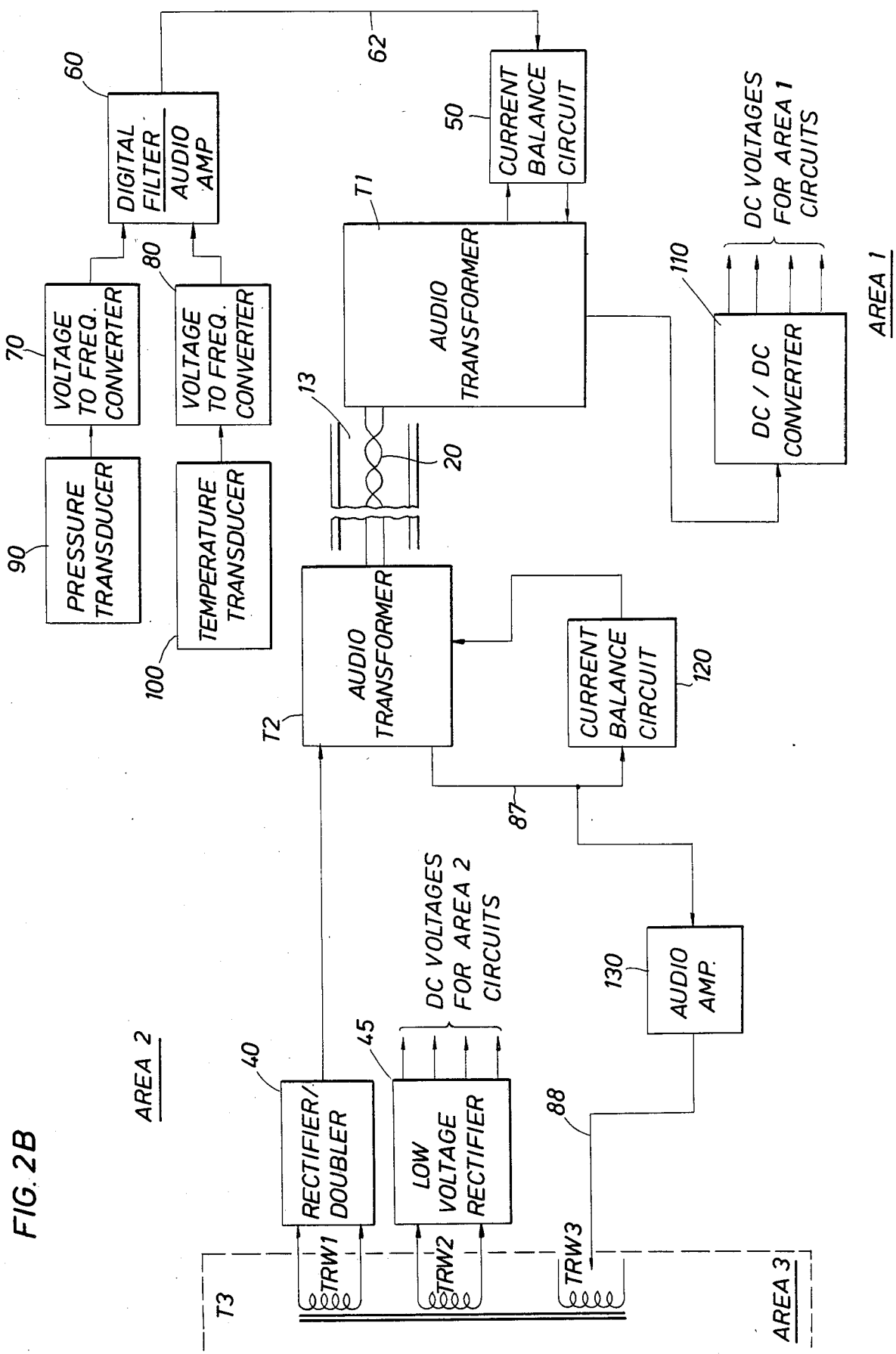

Turning now to FIGS. 2A and 2B, an overall functional diagram of the instrumentation and telemetry system is illustrated with designations corresponding to the physical location of the preferred embodiment of the invention. For example, FIG. 2B illustrates the area 1 or downhole transducers and downhole electronic circuits according to the invention. The leads 20 are schematically illustrated as extending through a borehole 13 to a downhole audio transformer T1. DC power is applied via the electrical pair 20 to the audio transformer T1 for providing DC voltages necessary for operation of the downhole area 1 circuits. The DC/DC converter 110 is illustrated as being coupled through the audio transformer T1. Two transducers are illustrated, pressure transducer 90 and temperature transducer 100 for generating signals representative of the downhole parameters of pressure and temperature. A voltage to frequency converter 70 is provided for generating an alternating current signal the frequency of which is proportional to the measured pressure from pressure transducer 90. Voltage to frequency converter 80 is provided for generating an alternating current signal the frequency of which is proportional to the measured temperature of temperature transducer 100. A digital filter and audio amplifier 60 is provided for adding, filtering and amplifying the two alternating current signals representative of pressure and temperature. The digital filter and audio amplifier 60 generates a frequency multiplexed signal of the combined alternating current signals representing pressure and temperature and has its output applied to the audio transformer T1 for applying the combined signal uphole via the two electrical leads 20.

A current balance circuit 50 according to the invention is provided for insuring that current produced by the high voltage DC applied on electrical leads 20 does not magnetically saturate the audio transformer T1 and therefore interfere with the linear coupling of the combined signal applied on lead 62 to the leads 20 for transmission uphole. The current balance circuit 50 insures that the primary and secondary windings of the audio transformer have DC currents flowing through them which are equal and opposite operably insuring that the magnetic saturation of the iron core of the transformer T1 is avoided.

Also shown in FIG. 2B is an audio transformer T2 disposed uphole in area 2 for receiving the multiplexed AC signal on leads 20. A second current balance circuit 120 is provided for audio transformer T2 and accomplishes a similar function for the audio transformer T2 as the current balance circuit 50 provides for the downhole audio tansformer T1. The frequency multiplexed signal on lead 87 is applied to audio amplifier 130 for coupling to area 3 and area 4 electronics as illustrated by the arrow 88.

FIG. 2A illustrates how the high voltage DC is generated for application to the leads 20 going downhole via transformer T2 (FIG. 2B). A square wave oscillator and power amplifier 30 generates a high frequency signal for application to the primary winding of transformer T3 and modulates a twenty-four volt DC source which is coupled via winding T3W1 (FIG. 2B) for application to a rectifier doubler circuit 40 which is transmitted to the secondary winding of transformer T2 and which in turn is applied directly to the leads 20.

The low voltage rectifier 45 (FIG. 2B) responds to the coupled voltage on the secondary side of transformer T3 for generating low DC voltages for area 2 circuits. As will be explained in more detail below, the alternating current signal on lead 88 from audio amplifier 130 is applied to the secondary winding T3W3 for coupling to the primary winding of T3 for application of the multiplexed signal to the two stage low pass filter 140 (FIG. 3A). After amplification of the multiplexed signal by means of signal amplifier 150, the multiplexed signal is transmitted via transformers T4 and T5 to the demodulation instrumentation circuits. A band pass filter 170 eliminates high frequency transients which may have been added to the multiplexed signal via the various coupling circuits and applies the filtered signal to a pressure channel and a temperature channel. A high pass filter 180 passes the alternating signal the frequency of which is representative of pressure to a frequency to voltage converter 190 generating a voltage signal representative of the downhole measured pressure. Voltage to current circuit 200 translates the voltage to a current signal for driving a recorder, meter or the like by means of a current signal proportional to pressure.

In a similar fashion, low pass filter 210 passes the lower frequency component of the combined multiplexed frequency signal and applies it to a frequency to voltage converter 220. The output of the frequency to voltage converter 220 generates a voltage signal corresponding to the measured downhole temperature. The voltage to current circuit 230 translates the voltage representing temperature to a current signal for driving another recorder indicative of the downhole temperature.

Also illustrated in FIG. 2A is a power source 240 connected to a nominal 115 VAC. Power supply 160, also 115 VAC powered, is for generating low DC voltages in order to power the area 4 circuits.

Turning now to FIG. 3A, the temperature channel of the downhole portion of the invention disposed in area 1 is illustrated. A temperature transducer or sensor 100 is disposed downhole for generating a current signal proportional to the downhole temperature. An amplifier 71 converts the slowly varying temperature signal generated by temperature transducer 100 to a corresponding voltage signal where the 1458 operational amplifier is the active component of amplifier 71. The slowly varying signal representative of temperature from amplifier 71 is applied to the voltage to square wave converter 72. At the heart of the voltage to square wave converter 72 is a voltage to square wave converting circuit denominated Teledyne 9402. At the output on lead 10, a square wave is generated and is illustrated in FIG. 3A" as being applied to a field effect transistor 1 of triangle wave generator 74. A sawtooth wave is generated by the 9402 circuit and appears on leads 11 and 12 output from the 9402 circuit. The sawtooth wave is illustrated in FIG. 3A' and is shown to have a frequency twice that of the square wave illustrated in FIG. 3A". The sawtooth wave is applied to a high input impedance noninverting amplifier 73 which includes 1458 operational amplifier.

The triangle wave generator 74 converts the sawtooth signal on lead 76 out of the high impedance noninverting amplifier 73 and generates a triangle wave illustrated in FIG. 3A''' on lead 77. The sawtooth signal applied at lead 76 is coupled via capacitors to the circuit comprising operational amplifier 1458 and resistors R1, R2, R3 and R4. When the field effect transistor FET1 which acts as an electronic switch is closed, or the positive input of the 1458 operational amplifier of triangle wave generator 74 is connected to ground, the numerical ohmic ratio of the feedback resistor R1 and the input resistor R4 is such that the operational amplifier has an effective gain of $-\frac{1}{3}$. That is, the sawtooth wave is applied to the negative input of the 1458 operational amplifier and the ratio of the feedback resistor R1 to the input resistor R4 is $\frac{1}{3}$. According to the preferred embodiment of the invention, R1 has a value of 10K ohms and R4 has a value of 30.1K ohms.

When the field effect transistor FET1 is effectively an open circuit, the sawtooth wave is effectively applied to the entire circuit of R1, R2, R3 and R4. Where resistor R1 is 10K, resistor R2 is 10K, resistor R3 is 10K and resistor R4 is approximately 30K or R1, R2 and R3 have essentially the same ohmic value and R4 is approximately three times the ohmic value of the other resistors, the gain of the 1458 operational amplifier is a non-inverting $+\frac{1}{3}$. As illustrated by the wave form of FIG. 3A' showing the sawtooth wave of frequency f and FIG. 3A" showing the square wave form of a frequency $\frac{1}{2}$ that of the sawtooth wave, the square wave is synchronous with the sawtooth wave f. That is, the start of the square wave begins with the start of the sawtooth wave f on positive going half cycles of the square wave and the negative going half cycle of the square wave starts with the subsequent start of the sawtooth wave.

Where the square wave is applied to the gate of the field effect transistor, the field effect transistor is effectively turned on during every other cycle of the sawtooth wave f. When it is turned on, the gain of the operational amplifier 1458 and the value of resistors R1 and R4 effectively cause the gain of circuit 74 to be $-\frac{1}{3}$ while when the field effect transistor is turned off on the negative going half cycles of the square wave, the gain of the operational amplifier 1458 and its associated resistors is a $+\frac{1}{3}$. The output of the 1458 operational amplifier results in a triangular wave appearing on lead 77 illustrated in FIG. 3A'''. The triangular wave appearing on lead 77 is applied to a triangle to sine wave converter 75 which is a differential amplifier configured to saturate such that the peaks of the triangular wave are limited. The output of the triangle to sine wave generator 75 appears on lead 78 and is applied to input B of FIG. 3C which will be discussed below after the discussion of the pressure channel.

Turning now to FIG. 3B, a pressure transducer 100 is illustrated as part of the downhole electronics and is responsive to the ambient pressure in the borehole. Preferably, the transducer is a strain gauge connected in a bridge circuit the output of which is applied to an instrumentation amplifier 81. The output of instrumentation amplifier 81 is applied to an offset circuit 82 which adds a DC voltage to the voltage representative of the pressure so that the frequency range for the voltage to square wave converter 83 corresponds to the range of pressures to be measured but is non-overlapping with the frequency range of the sine wave output on lead 78 of FIG. 3A representative of the temperature channel. The output of the offset circuit 82 is applied to the voltage to square wave converter 83 which has as its active element a voltage to square wave converter 9402 manufactured by the Teledyne Corporation. The output of the voltage to square wave converter 83 is applied to a 4049 inverter 84 and is applied to input A of FIG. 3C which will now be described.

As illustrated in FIG. 3C, the square wave having a frequency proportional to the measured pressure is applied at point A to adder 78 and the sine wave the frequency of which is proportional to the measured temperature is applied on lead B. The adder circuit 78 adds the two alternating signals, one of which is a nearly pure sine wave representative of temperature, the other which is a square wave the frequency of which represents pressure.

The combined signal output for adder 78 is applied to a digital filter and audio amplifier circuit designated as TP3040. A clock generator circuit 62 provides a clock input to the TP3040 circuit. The TP3040 circuit acts as a low pass filter with a sharp drop off. The particular circuit TP3040, commercially sold by National Semi Conductor and others, passes all frequencies from 0 to 3400 cycles per second. At this point it becomes apparent why the pure sine wave on lead 78 the frequency of which is representative of temperature is generated.

Since the TP3040 circuit is a low pass filter it will pass the nearly pure sine wave without harmonic generation. The temperature channel frequency range proportional to temperature is preferably from approximately 300 to 1500 HZ. The frequency range proportional to the measured pressure is approximately 2200 to 3400 HZ. By passing the square wave representative of pressure through the low pass filter, only the fundamental frequency of the square wave is passed. Yet the pure sine wave does not generate any harmonics through the low pass filter. Thus, the output from the TP3040 digital filter circuit appears as the sum of two nearly pure sine waves the frequency of each of which is proportional respectively to the two measured parameters of pressure and temperature. A guard frequency band from 2200 HZ, the lowest frequency of the pressure signal to 1500 HZ the highest frequency of the temperature signal exists between the combined sine waves generated on lead 61.

The frequency multiplexed signal appearing on lead 61 is applied via capacitor C2 and lead 52 to the winding T1W2 of the audio transformer T1 for coupling to the electrical leads 20 extending downhole.

FIG. 3C also shows how the DC voltage appearing on the twisted pair 20 extending downhole is applied to the DC/DC converter 110 via audio transformer T1. A series connection of the DC/DC converter 110 exists with the windings T1W1A and T1W1B of transformer T1. For example, the positive point P21 from one of the leads of the twisted pair is applied to the top of transformer T1W1A the bottom of which is connected to one side of the DC/DC converter 110. The other side of the DC/DC converter is applied through a current sensing resistor R10 which is connected to the top side of the winding T1W1B of transformer T1. The other side of the winding T1W1B is connected to point P20 connected to the other lead of the pair of leads 20. Thus, the DC current applied downhole is applied to the DC/DC converter 110 for generation of voltages for the area 1 or downhole circuits. As illustrated, the voltages are +15, +5, −5 and −15 volts necessary for operating the various operational amplifiers, digital filters and voltage to frequency converters discussed previously.

A current balance circuit 50 is responsive to the voltage across resistor R10 for generating a DC current on lead 52 for application through the other winding T1W2 of transformer T1. The current generated by the current balance circuit through lead 52 and through winding T1W2 is of equal magnitude to that flowing through windings T1W1A and T1W1B, but because of the winding direction of T1W2 and T1W1A, T1W1B being of opposite direction, as illustrated by the magnetic coupling "dots" of FIG. 3C, the magnetic flux created through the winding T1W2 is equal and opposite to that created in the T1W1A and T1W1B windings. Thus, the saturation of the iron core of the audio transformer is avoided creating a linear inductive coupling for the AC signal applied on lead 52 for inductively coupling such signal via the windings T1W1A and T1W1B to the leads 20.

The operational amplifier of the current balance circuit 50 is an LM258 operational amplifier (sold by National Semi Conductor and others) of unity gain because resistor R13 from its output to its negative input is equal to the sum of the resistance values connected between the output of the operational amplifier back to its positive input. Thus, the currents flowing from the output to the negative input and the output to the positive input are such as to maintain the voltage applied across the two input circuits the same. The voltage applied across the input is that voltage impressed across resistor R10 which is in series with the windings T1W1A and T1W1B and the DC/DC converter 110. Thus, the voltage across the input of the operational amplifier is proportional to the current flowing in the secondary side of the transformer. That being the case, the voltage generated across R20 is identical to that appearing across R10. The current generated in resistor R20 is therefore applied to the winding T1W2 and achieves the desired current balancing effect.

The necessity for the current balancing circuit 50 in the apparatus and system according to the invention is necessary because of its small size required of its downhole location. Small size requires that a magnetic core transformer be used in order to achieve sufficient coupling from one winding to the other. The application of DC current downhole on the leads 20 through windings T1W1A and T1W1B therefore necessitates an equal and opposite current flow through T1W2 as illustrated in FIG. 3C in order to prevent magnetic saturation of the transformer.

The AC signal applied on lead 52 from lead 61 and the digital filter audio amplifier 60 is coupled to windings T1W1A and T1W1B to inductively couple the combined AC signal to the points P20 and P21 for transmission uphole via leads 20.

Turning now to FIG. 4, the electronics disposed at the wellhead (area 2) are illustrated. Points P21 and P20 and electrical pair 20 are shown connected to the secondary windings of audio transformer T2. The AC signal impressed on leads 20 are inductively coupled from the secondary windings to the primary winding T2W2 and is applied via lead 122 to audio amplifier circuit 130. The audio transformer T2 is current balanced in much the same way as the downhole audio transformer T1 is balanced. Two hundred (200) volts DC is applied through the secondary windings T2W1A and T2W1B and back to virtual ground via resistor R100. In order that transformer T2 not be magnetically saturated, an equal but opposite DC current is generated by current balance circuit 120 for applying through transformer winding T2W2. The DC voltage generated across resistor R100 is indicative of the current flowing in the secondary windings T2W1A, T2W1B. That voltage is applied across the input of the operational amplifier LM258 of the current balance circuit 120. For the same reasons as discussed previously with respect to current balance circuit 50 in the downhole electronics, the current generated through R201 of the feedback circuit from the operational amplifier of the current balance generates an equal and opposite current for application through the winding T2W2.

The high voltage rectifier and doubler circuit 40 and the low voltage current supply for the area 2 electronic circuits 45 receive their power inductively via transformer T3 located in area 3. Advantageously, the AC for generating DC power for transmission is inductively coupled across the transformer T3 at wellhead 12, and the AC signal comprising simisoids representative of downhole measured parameters is inductively copled upwardly across the transformer T3 at wellhead R.

Figure 5A:
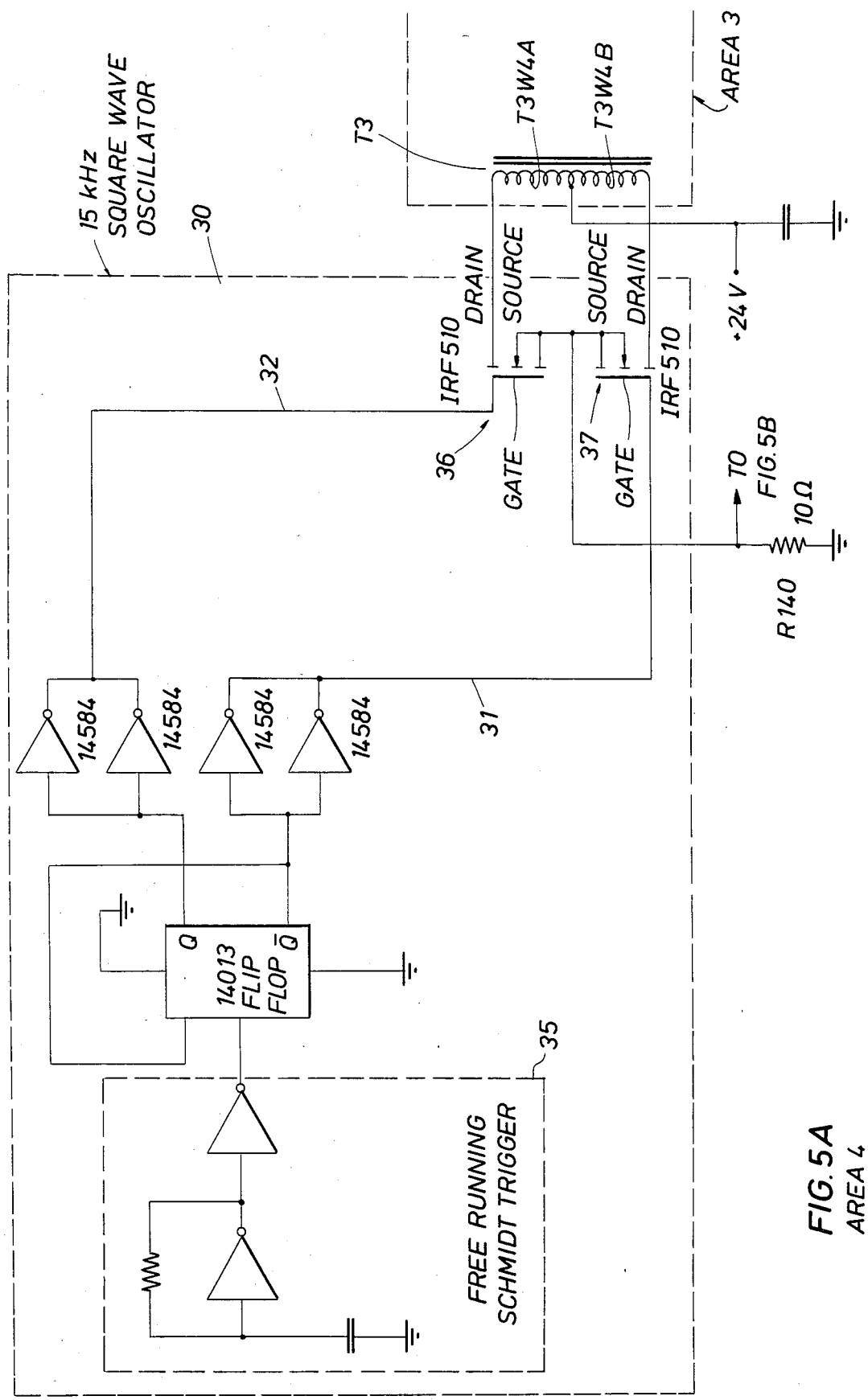

As illustrated in FIG. 5A, a 15 kilohertz square wave oscillator circuit 30 alternatingly connects the 24 volt source to the winding T3W4A of transformer T3 via the IRF510 field effect transistors. As illustrated in FIG. 4, the 15 kilohertz 24 volt signal is inductively coupled to the windings T3W1, T3W2 via windings T3W3A and T3W3B. The low voltage current supply for area 2 circuit 45 uses the voltage induced in winding T3W1 to generate the plus and minus current sources for area 2 circuits. The winding T3W2 uses the voltage induced therein in the high voltage rectifier and doubler circuit 40 to produce a 200 volt DC voltage on lead 41 for insertion into the winding T2W1A nd into one lead of the pair 20 and after round trip to the downhole electronics back from the other lead through the winding T2W1B and to the resistor R100 to virtual ground.

Turning again to FIG. 5A and the 15 kilohertz square wave oscillator circuit 30, the 15 kilohertz signal is generated by providing a free running inverting Schmidt trigger gate circuit 35 which is applied to a flip flop circuit Motorola 14013. The flip flop circuit generates a square wave one half of which is applied via lead 32 to the gate of the upper depletion mode field effect transistor 36 (an IRF510 FET) and on the other half cycle via the lead 31 to the gate of the lower field effect transistor 37 (another IRF510 FET). Thus, the 24 volt source illustrated in FIG. 4 is alternately applied to first the T3W4A winding through the drain and source of FET 36 and back to a resistor R140 and on the other half cycle is applied through the winding T3W4B from the drain to the source of FET 37 and again back through resistor R140. By modulating the 24 volts applied to windings T3W4A and T3W4B, the secondary windings T3W3A and T3W3B of transformer T3 (FIG. 4) are alternately changed in polarity. The audio signal comprising the two AC frequency multiplexed signals from audio amplifier 130 are applied to the commutation circuit 135 (FIG. 4) and are applied to the windings T3W3A and T3W3B in alternating fashion. Each time the primary of the transformer T3 alternates, the phase of the audio signal is switched by means of the diodes 1N914 of circuit 135. In so doing, the frequency multiplexed signal on lead 132 is inductively coupled to the windings T3W4A and T3W4B in synchronism with the 15 kilohertz square wave applied to the IRF510 field effect transistors and the frequency multiplex signal appears across resistor R140 on FIG. 5A.

Figure 5B:
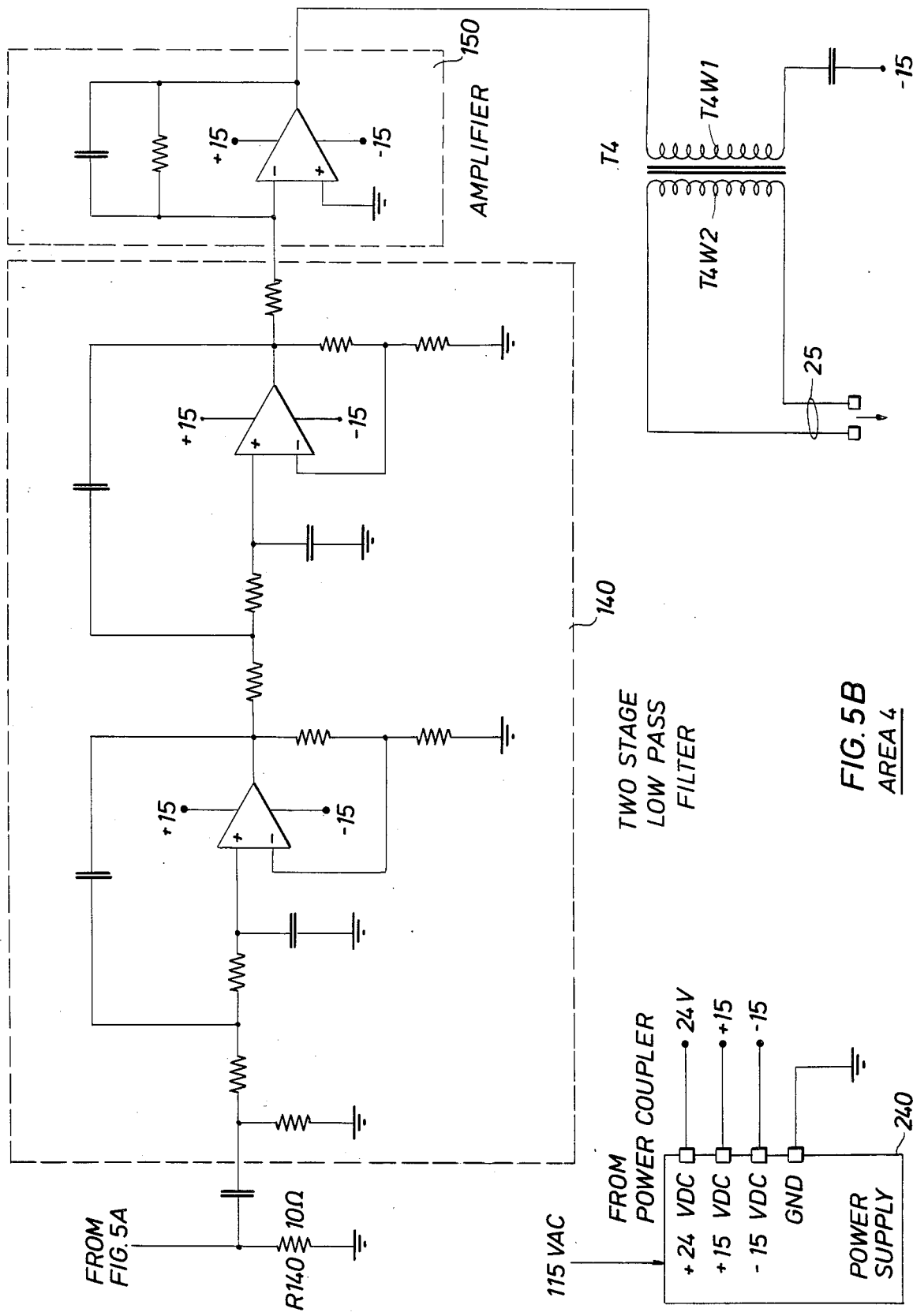

FIG. 5B reproduces resistor R140 across which the downhole frequency multiplexed signal appears. A two stage low pass filter 140 is responsive to the signal appearing across resistor R140 and serves to eliminate any 15 kilohertz signal which may appear across resistor R140 and eliminates any transients which may have resulted through the commutation circuit. Amplifier 150 amplifies the filtered multiplexed signal and applies it to transformer T4 for inductively coupling it from winding T4W1 to winding T4W2. The output of the secondary winding T4W2 is applied via leads 25 to demodulation circuits illustrated in FIGS. 6A and 6B.

Turning now to FIGS. 6A and 6B, the transformer T4 is reproduced and the winding T4W2 is illustrated as being connected to leads 25 which are connected to the primary of another transformer T5. The secondary of the transformer T5 has impressed across it the audio signal which has been previously filtered as described above. The signal is applied to a digital filter via a gain setting resistor R60. A TP3040 band pass filter passing frequencies from 100 to 3400 HZ responds to the audio signal and has a clock circuit 171 provided for its operation. The output of digital filter circuit 170 is applied to a high pass filter 180 and a low pass filter 210. The high pass filter passes AC frequencies from 1700 HZ and above while the low pass filter passes AC signals from 0 to 1700 HZ. The output of high pass filter 180 is applied to a frequency to voltage converter circuit 190 as illustrated in FIG. 6B while the output of the low pass filter 210 is applied to the frequency to voltage converter circuit 220. The frequency to voltage converter circuits are preferably Teledyne 9402 integrated circuits. The output from frequency to voltage converter circuit 190 is applied first to an offset eliminator circuit 191 and then to a voltage to current converter circuit 200. The frequency to voltage converter 190 reproduces the slowly varying DC voltage which is characteristic of the downhole pressure and the offset eliminator circuit 191 eliminates an offset applied downhole for the purpose of providing frequency separation of the modulated signals. The voltage to current converter 200 provides a current output available at point "P" proportional to the voltage output of circuit 191 and may be used to drive meters, chart recorders or the like.

In a similar fashion, the offset eliminator circuit 221 is responsive to the slowly varying voltage from the frequency to voltage converter 220 which is representative of the temperature measure downhole. The voltage to current signal 230 translates, after offset elimination by circuit 221, the temperature signal 28 current signal proportional to the downhole temperature for driving a meter or chart recorder in the same way as the voltage to current converter 220 generated a current responsive to pressure.

It should be emphasized that the inductive couplers illustrated in FIG. 2 which form part of the transformers T3 and T4, may be directly electrically coupled where a wellhead 12 is not provided subsea. Thus, on a land well where the wellhead 12 is not submerged in water or where the wellhead 12 is on a platform above the water, direct electrical couplings may be provided in substitution for the transformers T3 and T4.

Various modifications and alterations in the described structures and systems and circuits will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments is to be interpreted as illustrative and not limitative

What is claimed is:

1. In a downhole instrumentation system having two electrical leads for simultaneously transmitting uphole at least one AC signal indicative of a downhole parameter and for transmitting downhole DC to power downhole electrical circuits, a circuit arrangement comprising a transformer having first and second winding means,
a DC/DC converter circuit means connected in series with said first winding means, the series connection of the converter circuit means and the first winding means being connected to said two electrical leads, the DC/DC converter circuit means for converting a DC voltage applied on said two electrical leads for powering said downhole electrical circuits,
means for generating a current indicator signal indicative of the DC current flowing in said first winding means,
a current balance circuit means responsive to said current indicator signal for applying through said second winding means a DC current which is substantially the same in magnitude but of opposite direction as the DC current flowing in said first winding means,
operably preventing saturation of said transformer when said AC signal is applied to said second winding means for inductive coupling of said AC signal to said first winding means,
wherein said first winding means includes first and second sub-windings, each sub-winding having first and second ends, the second end of the first sub-winding being connected to the first end of the second sub-winding via a capacitor, with the first end of the first sub-winding connected to one of said electrical leads and the second end of the second sub-winding connected to the other of said electrical leads,
said DC/DC converter circuit means is connected between the second end of the first sub-winding and the first end of the second sub-winding in series with said current indicator signal generator means,
wherein said current indicator generating means is a first resistor, the DC current flowing through the series connection of said first and second sub-windings and said DC/DC converter circuit means in series with said resistor generating a voltage across said resistor indicative of DC current flowing in said first winding, wherein said current balance circuit means comprises,
an operational amplifier having positive and negative input terminals and an ouput terminal,
a second resistor connected between said output terminal and the negative input terminal of said operational amplifier,
a third resistor having one end connected to the output terminal of said operational amplifier,
a fourth resistor having one end connected to the positive input terminal of said operational amplifier and having its other end connected to the other end of said third resistor, the third resistor being equal in resistance value to said first resistor, the sum of the resistance values of said third resistor and said forth resistor being substantially the same as the resistance value of said second resistor,
means for applying the voltage generated across said first resistor across said positive and negative input terminals of said operational amplifier, and
means for applying the DC current generated through said third resistor through said second winding in a direction opposite the DC current flowing in said first winding operably preventing magnetic saturation of said transformer.

2. In a downhole instrumentation system having two electrical leads for transmitting uphole one AC signal indicative of a first and a second downhole parameter, a circuit arrangement comprising,
a first transducer means for generating a first signal indicative of a first parameter,
a first voltage to frequency circuit means responsive to said first signal for generating a first square wave signal having a frequency proportional to said first signal, the frequency range of said square wave signal being from a first frequency $f_1$ to a second frequency $f_2$ corresponding to the dynamic range of said first signal,
circuit means responsive to said first square wave signal for generating an essentially pure first sine wave signal having the same fundamental frequency as the first square wave signal,
a second transducer means for generating a second signal indicative of a second parameter,
a second voltage to frequency circuit means for generating a second square wave signal having a frequency proportional to said second signal, the frequency range of said square wave signal being from a third frequency $f_3$ to a fourth frequency $f_4$ corresponding to the dynamic range of said second signal, the frequency $f_3$ being larger than the frequency $f_2$, the difference in frequencies between $f_3$ and $f_2$ defining a guard frequency range,
means for adding said first sine wave signal to said second square wave to generate a first combined signal,
low pass filter means having a frequency cut-off at approximately the frequency $f_4$ for converting said second square wave signal to a second essentially pure sine wave signal having the same fundamental frequency as the second square wave signal and for generating a second combined signal comprising said first sine wave signal and said second sine wave signal, and
means for applying said second combined signal to said two electrical leads for transmitting said signal uphole.

3. The circuit arrangement of claim 2 wherein said first parameter is downhole temperature and said second parameter is downhole pressure.

4. The circuit arrangement of claim 2 wherein said circuit means responsive to the first square wave signal for generating an essentially pure first sine wave signal having the same fundamental frequency as the first square wave signal comprises,
means for generating a sawtooth wave signal in synchronism with said first square wave signal and having a frequency twice that of said first square wave signal,
circuit means responsive to said sawtooth wave signal and to said square wave signal for generating a triangular wave signal in synchronism with said first square wave signal, and
differential amplifier means responsive to said triangular wave signal for generating said first sine wave signal.

5. The circuit arrangement of claim 4 wherein said circuit means for generating a triangular wave signal comprises,
an operational amplifier having a negative input terminal, a positive input terminal and an output terminal,
a first resistor of R ohms connected between the output terminal and the negative input terminal of said operational amplifier,
a second resistor of R ohms connected between the positive input terminal and a common point,
a third resistor of R ohms connected between the positive input terminal and ground,
a fourth resistor of approximately 3R ohms connected between the negative input terminal and said common point,
switch means connected between said positive input terminal and ground,
means for applying said sawtooth wave signal to said common point to which said second and said fourth resistors are connected, and
means for applying said square wave signal to said switch means operably alternatingly connecting said positive input terminal to ground or to the connection between said second and third resistors on alternating half cycles of said square wave, whereby during first half cycles of said square wave said sawtooth wave signal is amplified by plus one-third and during second half cycles of said square wave said sawtooth wave signal is amplified by minus one-third operably producing a triangularly shaped wave signal at the output of said opernational amplifier.

6. The circuit arrangement of claim 5 wherein said switch means is a field effect transistor.

7. A measuring and telemetering system for measuring at least two parameters in a borehole and telemetering at least two signals indicative of the parameters to a wellhead of the borehole, comprising
a pair of electrical leads extending from the borehole wellhead to a measuring location below in the borehole,
means disposed at the wellhead for generating and applying a relatively high DC voltage to said electrical leads for transmission of DC power to said measuring location,
a DC/DC converter means disposed at the measuring location in the borehole and connected in series with a first winding means of a measuring location iron core transformer, the series combination of the first winding means and the DC/DC converter connected in series with the two electrical leads at the measuring location in the borehole, the DC/DC converter circuit means for converting the relatively high DC voltage on said electrical leads to relatively low voltages necessary to power measuring location electrical circuits, means for generating a current indicator signal indicative of the DC current flowing in said first winding means of said measuring location transformer, a current balance circuit means responsive to said current indicator signal for applying through a second winding means of said measuring location transformer a DC current which is substantially the same in magnitude but of opposite direction as the DC current flowing in the first winding means, first and second measuring location transducer means for generating first and second downhole measurement signals indicative of said at least two parameters in the borehole, measuring location multiplexing means responsive to said first and second downhole measurement signals for generating a combined AC signal comprised of two downhole audio AC signals, the frequency of said two audio AC signals being indicative respectively of said first and second downhole measurement signals, means for applying said combined AC signal to a second winding of said measuring location iron core transformer for inductive coupling of said combined AC signal to said first winding of said transformer for transmission of said combined AC signal to the borehole wellhead via said electrical leads, wherein said first winding means includes first and second sub-windings, each sub-winding having first and second ends, the second end of the first sub-winding being connected to the first end of the second sub-winding via a capacitor, with the first end of the first sub-winding connected to one of said electrical leads and the second end of the second sub-winding connected to the other of said electrical leads, and wherein said DC/DC converter circuit means is connected between the second end of the first sub-winding and the first end of the second sub-winding in series with said current indicator signal generator means, said current balance circuit means comprises, an operational amplifier having positive and negative input terminals and an output terminal, a second resistor connected between said output terminal and the negative input terminal of said operational amplifier, a third resistor having one end connected to the output terminal of said operational amplifier, a fourth resistor having one end connected to the positive input terminal of said operational amplifier and having its other end connected to the other end of said third resistor, the third resistor begin equal in ohms resistance value to said first resistor, the sum of the ohms resistance values of said third resistor and said fourth resistor being substantially the same as the ohms resistance value of said second resistor, means for applying the voltage generated across said first resistor across said positive and negative input terminals of said operational amplifier, and means for applying the DC current generated through said third resistor through said second winding in a direction opposite the DC current flowing in said first winding operably preventing magnetic saturation of said transformer.

8. A measuring and telemetering system for measuring at least two parameters in a borehole and telemetering at least two signals indicative of the parameters to a wellhead of the borehole, comprising a pair of electrical leads extending from the borehole wellhead to a measuring location below in the borehole, means disposed at the wellhead for generating and applying a relatively high DC voltage to said electrical leads for transmission of DC power to said measuring location, a DC/DC converter means disposed at the measuring location in the borehole and connected in series with a first winding means of a measuring location iron core transformer, the series combination of the first winding means and the DC/DC converter connected in series with the two electrical leads at the measuring location in the borehole, the DC/DC converter circuit means for converting the relatively high DC voltage on said electrical leads to relatively low voltages necessary to power measuring location electrical circuits, means for generating a current indicator signal indicative of the DC current flowing in said first winding means of said measuring location transformer, a current balance circuit means responsive to said current indicator signal for applying through a second winding means of said measuring location transformer a DC current which is substantially the same in magnitude but of opposite direction as the DC current flowing in the first winding means, first and second measuring location transducer means for generating first and second downhole measurement signals indicative of said at least two parameters in the borehole, measuring location multiplexing means responsive to said first and second downhole measurement signals for generating a combined AC signal comprised of two donwhole audio AC signals, the frequency of said two audio AC signals being indicative respectively of said first and second downhole measurement signals, means for applying said combined AC signal to a second winding of said measuring location iron core transformer for inductive coupling of said combined AC signal to said first winding of said transformer for transmission of said combined AC signal to the borehole wellhead via said electrical leads, wherein said first winding means includes first and second sub-windings, each sub-winding having first and second ends, the second end of the first sub-winding being connected to the first end of the second sub-winding via a capacitor, with the first end of the first sub-winding connected to one of said electrical leads and the second end of the second sub-winding connected to the other of said electrical leads, and wherein said DC/DC converter circuit means is connected between the second end of the first sub-winding and the first end of the second sub-winding in series with said current indicator signal generator means, wherein said first and second measuring location transducer means comprise
- a first transducer means for generating a first signal indicative of a first parameter,
- a second transducer means for generating a second signal indicative of a second parameter, and wherein said measuring location multiplexing means comprises,
- a first voltage to frequency circuit means responsive to said first signal for generating a first square wave signal having a frequency proportional to said first signal, the frequency range of said square wave signal being from a first frequency $f_1$ to a second frequency $f_2$ corresponding to the dynamic range of said first signal,
- circuit means responsive to said first square wave signal for generating an essentially pure first sine wave signal having the same fundamental frequency as the first square wave signal,
- a second voltage to frequency circuit means for generating a second square wave signal having a frequency proportional to said second signal, the frequency range of said square wave signal being from a third frequency $f_3$ to a fourth frequency $f_4$ corresponding to the dynamic range of said second signal, the frequency $f_3$ being larger than the frequency $f_2$, the difference in frequencies between $f_3$ and $f_2$ defining a guard frequency range,
- means for adding said first sine wave signal to said second square wave to generate a first combined signal, and
- low pass filter means having a frequency cut-off at approximately the frequency $f_4$ for converting said second square wave signal to a second essentially pure sine wave signal having the same fundamental frequency as the second square wave signal and for generating a second combined signal comprising said first sine wave signal and said second sine wave signal.

9. The system of claim 8 wherein said first parameter is downhole temperature and said second parameter is downhole pressure.

10. The system of claim 9 wherein said circuit means responsive to the first square wave signal for generating an essentially pure first sine wave signal having the same fundamental frequency as the first square wave signal comprises,
- means for generating a sawtooth wave signal in synchronism with said first square wave signal and having a frequency twice that of said first square wave signal,
- circuit means responsive to said sawtooth wave signal and to said square wave signal for generating a triangular wave signal in synchronism with said first square wave signal, and
- differential amplifier means responsive to said triangular wave signal for generating said first sine wave signal.

11. The system of claim 20 wherein said circuit means for generating a triangular wave signal comprises,
- an operational amplifier having a negative input terminal, a positive input terminal and an output terminal,
- a first resistor of R ohms connected between the output terminal and the negative input terminal of said operational amplifier,
- a second resistor of R ohms connected between the positive input terminal and a common point,
- a third resistor of R ohms connected between the positive input terminal and ground,
- a fourth resistor of apprpximately 3 R ohms connected between the negative input terminal and said common point,
- switch means connected between said positive input terminal and ground,
- means for applying said sawtooth wave signal to said common point to which said second and said fourth resistors are connected, and
- means for applying said square wave signal to said switch means operably alternatingly connecting said positive input terminal to ground or to the connection between said second and third resistors on alternating half cycles of said square wave, whereby during first half cycles of said square wave said sawtooth wave signal is amplified by plus one-third and during second half cycles of said square wave said sawtooth wave signal is amplified by minus one-third operably producing a triangularly shaped wave signal at the output of said operational amplifier.

* * * * *